United States Patent Office 3,546,242
Patented Dec. 8, 1970

3,546,242
2-(4'-CHLORO-NAPHTHYL(1')-METHYL)-IMIDAZOLINE
Elena Massarani, Milan, Italy, assignor to Societe d'Exploitations Chimiques et Pharmaceutiques Seceph S.A., Lugano, Switzerland
No Drawing. Filed May 10, 1968, Ser. No. 728,342
Claims priority, application Switzerland, May 25, 1967, 7,415/67
Int. Cl. C07d 49/34
U.S. Cl. 260—309.6
2 Claims

ABSTRACT OF THE DISCLOSURE 2-(4'-chloro-naphthyl(1')-methyl)-imidazoline, its acid addition salts and quaternary ammonium salts. Also methods of preparation, preferably reacting 4-chloro-naphthyl(1)-acetonitrile with ethylenediamine or a salt of the latter. The compound exhibits substantial vasoconstrictive activity and can be used in the treatment of inflammatory conditions of the conjunctival or nasal mucosa.

---

This invention relates to a new therapeutically active chemical compound, namely 2-(4'-chloro-naphthyl(1')-methyl)-imidazoline of the formula

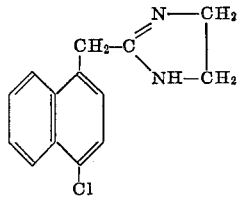

as well as its acid addition salts and its quaternary ammonium salts.

Therapeutically acceptable acid addition salts include the mineral acid salts, e.g., hydrochloride, hydrobromide, hydroiodide, sulphate, phosphate and nitrate. Acid addition salts are prepared by conventional methods of acidifying the free base. Thus the hydrobromide, hydroiodide and hydrochloride salts may be prepared by acidifying an ethanol solution of the free base with aqueous solutions of hydrobromic acid, hydroiodic acid or hydrochloric acid, respectively. The sulphate and phosphate salts may be prepared by acidifying an acetone solution of the free base with sulfuric acid 20% aqueous solution and phosphoric acid 85% solution, respectively. The nitrate salt may be prepared by acidifying an alcohol solution of the base with a concentrated solution of the nitric acid.

The quaternary ammonium salts may be prepared by conventional means, e.g., treating an ethanol solution of the free base with an alkyl halide such as methyl iodide.

This new imidazoline derivative has a surprising vasoconstrictive activity which is about four times more intense than that of the known compound 2-(naphthyl(1')-methyl)-imidazoline, as appears from comparative tests carried out by the Burn method (Practical Pharmacology, published by Blackwell Scient. Publ., Oxford), by perfusion of an isolated guinea pig ear. The Ringer-Locke liquid was used as perfusion medium and the measurements were carried out at a temperature of 37° C. and a pressure of 60 cm. of water. On the basis of the results, it was calculated that the dose capable of reducing the flow of the liquid by 50% is 0.00019 ν/cc. in the case of 2-(4'-chloro-naphthyl(1') - methyl) - imidazoline and 0.00082 ν/cc. in the case of 2-(naphthyl(1')-methyl)-imidazoline.

As previously indicated the new compound or its therapeutically acceptable mineral acid salts or quaternary ammonium salts is used in the treatment of inflammatory conditions of the conjunctival or nasal mucosa. The compounds are preferably used in dilute aqueous solutions which are administered in the form of drops to the conjunctival sac or the nose. For example, the 2-(4'-chloro-naphthyl(1')-methyl)-imidazoline hydrochloride in form of 0.02% aqueous solution may be used in doses of 1-2 drops instilled in the conjunctival sac or the nose.

The preferred method of preparing the 2-(4'-chloro-naphthyl(1')-methyl)-imidazoline consists in reacting 4-chloro-naphthyl(1)-acetonitrile with ethylene diamine or a salt of the latter, preferably with p-toluene sulfonate of 2-amino-ethyl-ammonium in accordance with the following reaction:

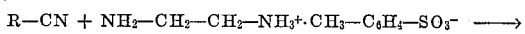

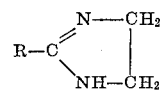

In the above formula and in the following description R is the 4-chloro-naphthyl(1)-methyl radical of the formula:

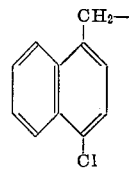

The 4-chloro-naphthyl(1)-acetonitrile can be prepared by the reaction of a 4-chloro-1-halomethyl-naphthalene with an alkaline metal cyanide.

As other methods which can be used for the preparation of the 2-(4'-chloro-naphthyl(1')-methyl)-imidazoline, the following may be mentioned:

Reaction of 4-chloro-naphthyl(1)-acetonitrile with an ethylene halide, preferably ethylene bromide, and ammonia.

Reaction of 4-chloro-naphthyl(1)-acetonitrile with a 1-amino-2-halo-ethane, preferably 1-amino-2-chloro-ethane, or a salt thereof.

Reaction of 4-chloro-naphthyl(1)-acetonitrile with monoethanolamine or a salt thereof.

Reaction of 4-chloro-naphthyl(1)-acetamide or 4-chloro-naphthyl(1)-thioacetamide with a 1-amino-2-halo-ethane, preferably 1-amino-2-bromo-ethane, or a salt thereof.

Reaction of 4-chloro-naphthyl(1)-acetic acid with ethylene diamine or a salt thereof.

Reaction of 4-chloro-naphthyl(1)-acetiminoethyl ether or a salt thereof of the formula

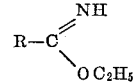

with ethylene diamine or a salt thereof. The 4-chloro-naphthyl(1)-acetiminoethyl ether can be prepared by alcoholysis of 4-chloro-naphthyl(1)-acetonitrile in the presence of an inorganic acid.

Reaction of 1-(4'-chloro-naphthyl-1')-2-ethoxyacetylene with ethylene diamine.

Cyclization of mono-(4-chloro-naphthyl-1)-acetylethylene diamine of the formula:

The mono-(4-chloro-naphthyl-1)-acetyl-ethylene diamine can be prepared by hydrogenation of N-[(4-chloro-naphthyl-1)-acetyl]-aminoacetonitrile.

The following examples serve to illustrate the preferred method of preparing 2-(4'-chloro-naphthyl(1')-methyl)-imidazoline.

EXAMPLE 1

A mixture of 2.01 g. (0.01 mol) of 4-chloro-naphthyl(1)-acetonitrile, 2.32 g. (0.01 mol) of 2-amino-ethylammonium p-toluene sulfonate and 3 cc. of ethylene glycol is heated with agitation at 190° C. for 4 hours, during which ammonia is liberated. The reaction mixture while still hot is poured into 150 cc. of a 20° sodium carbonate solution. An oily mass separates out which is extracted with methylene chloride. The extract is dried over anhydrous sodium sulfate and the solvent evaporated. One thus obtains 1.46 g. (59% of the theoretical yield) of 2-(4'-chloronaphthyl(1')-methyl)-imidazoline, M.P. 130–132° C. After crystallization in a mixture of ethanol and water, the melting point rises to 142–143° C. and the product distills at 197° C./0.4 mm. Hg. The crude base can be transformed directly into hydrochloride by treating the latter in ethanolic solution with gaseous hydrochloride. By addition of anhydrous ether, there is obtained 1.55 g. of the crystalline hydrochloride, M.P. 256–257° C.

*Analysis.*—$C_{14}H_{13}N_2Cl \cdot HCl$—Calculated (percent): C, 59.80; H, 5.02; N, 9.96; Cl, 25.22. Found (percent): C, 59.84; H, 5.25; N, 9.89; Cl, 25.32.

By acidification of an alcoholic solution of the base with concentrated nitric acid, there is obtained the nitrate which melts at 193–194° C.

*Analysis.*—$C_{14}H_{13}N_2Cl \cdot HNO_3$—Calculated (percent): C, 54.64; H, 4.59; Cl, 11.52; N, 13.66. Found (percent): C, 54.36; H, 4.82; Cl, 11.78; N, 13.82.

The initial 4-chloro-naphthyl(1)-acetonitrile can be prepared as follows:

A mixture of 21.10 g. (0.1 mol) of 4-chloro-1-chloromethyl naphthalene, 6.2 g. (0.095 mol) of potassium cyanide, 0.3 g. of potassium iodide, 50 cc. of 95% ethanol and 5 cc. of water is heated under reflux for 6 hours. Thereupon the solvent is expelled by evaporation under vacuum, the residue is dissolved in water and extracted with ether. The extract is washed with a thiosulfate solution and then with water, dried over sodium sulfate and concentrated. The 4-chloro-naphthyl(1)-acetonitrile distills at 150–154° C./0.8 mm. Hg in a quantity of 19.1 g. M.P. 77–78° C. after crystallization from 95% ethanol.

*Analysis.*—$C_{12}H_8NCl$—Calculated (percent): C, 71.47; H, 3.99; N, 6.94; Cl, 17.58. Found (percent): C, 71.38; H, 4.28; N, 7.25; Cl, 17.30.

EXAMPLE 2

A mixture of 2.01 g. of 4-chloro-naphthyl(1)-acetonitrile and 0.6 g. of ethylene diamine hydrochloride is heated at 180–185° C. for 1¼ hours. The reaction mixture while still hot is poured into 150 cc. of a 20% sodium carbonate solution. An oily mass separates out which is extracted with methylene chloride. The extract is dried over anhydrous sodium sulfate and the solvent evaporated, thus obtaining 1.81 g. (71% of the theoretical yield) of a product identical to that obtained in Example 1.

What is claimed is:
1. A compound selected from the group consisting of 2-(4'-chloro-naphthyl(1')-methyl)-imidazoline, its pharmaceutically acceptable acid addition salts and lower alkyl quarternary ammonium salts.
2. A compound according to claim 1 consisting of 2-(4'-chloro-naphthyl(1')-methyl)-imidazoline hydrochloride.

References Cited

UNITED STATES PATENTS 2,948,724    8/1960    Sahyun et al. _____ 260—251

OTHER REFERENCES

De Pascale et al., Boll. Soc. Ital. Biol. Sper. 39 (24), 2040–3 (1963).

Faust et al., J. Org. Chem. 26, 4044–7 (1961).

HENRY R. JILES, Primary Examiner

G. T. TODD, Assistant Examiner

U.S. Cl. X.R.

424—273